United States Patent [19]

Kappele et al.

[11] Patent Number: 5,994,427
[45] Date of Patent: Nov. 30, 1999

[54] HIGH PERFORMANCE INK COMPOSITIONS WITH NON-BENZIDINE BASED COLORANTS

[75] Inventors: William David Kappele, Georgetown; Anna Marie Pearson, Richmond, both of Ky.

[73] Assignee: Lexmark International, Inc., Lexington, Ky.

[21] Appl. No.: 08/974,633

[22] Filed: Nov. 19, 1997

Related U.S. Application Data

[63] Continuation-in-part of application No. 08/820,379, Mar. 12, 1997, Pat. No. 5,925,692.

[51] Int. Cl.$^6$ ............ C09D 11/02; C09D 11/10; C09D 133/08; C09D 133/10
[52] U.S. Cl. ............ 523/160; 523/161; 106/31.6; 106/31.75
[58] Field of Search ............ 106/31.27, 31.28, 106/31.29, 31.3, 31.59, 31.6, 31.61, 31.43, 31.49, 31.51, 31.75, 31.78, 31.8; 523/160, 161

[56] References Cited

U.S. PATENT DOCUMENTS

| | | | |
|---|---|---|---|
| 4,446,470 | 5/1984 | Sugiyama et al. | 347/3 |
| 5,225,301 | 7/1993 | Yushina et al. | 430/106 |
| 5,316,575 | 5/1994 | Lent et al. | 106/20 R |
| 5,501,726 | 3/1996 | Yui et al. | 106/20 R |
| 5,529,617 | 6/1996 | Yamashita et al. | 106/20 R |
| 5,538,548 | 7/1996 | Yamazaki | 106/20 C |
| 5,603,756 | 2/1997 | Suzuki et al. | 106/22 R |
| 5,679,141 | 10/1997 | McInerney et al. | 106/31.6 |
| 5,679,142 | 10/1997 | McInerney et al. | 106/31.6 |
| 5,704,969 | 1/1998 | Kanaya et al. | 106/31.48 |
| 5,719,204 | 2/1998 | Beach et al. | 523/161 |
| 5,725,651 | 3/1998 | Zambounis et al. | 106/497 |
| 5,738,716 | 4/1998 | Santilli et al. | 106/31.77 |
| 5,746,817 | 5/1998 | Katsen et al. | 106/31.65 |
| 5,749,951 | 5/1998 | Yoshiike et al. | 106/31.27 |
| 5,755,872 | 5/1998 | Urban et al. | 106/495 |
| 5,811,543 | 8/1998 | Hao et al. | 540/123 |
| 5,882,390 | 3/1999 | Nagai et al. | 106/31.49 |

*Primary Examiner*—Vasu Jagannathan
*Assistant Examiner*—Callie E. Shosho
*Attorney, Agent, or Firm*—John A. Brady

[57] ABSTRACT

High performance ink compositions are described and the ink compositions have a novel colorant set which includes a quinacridone, a phthalocyanine and a monoazo compound, and no benzidine based colorants.

27 Claims, No Drawings

HIGH PERFORMANCE INK COMPOSITIONS WITH NON-BENZIDINE BASED COLORANTS

This application is a continuation in part of U.S. application Ser. No. 08/820,379, filed Mar. 12, 1997 now U.S. Pat. No. 5,925,692 entitled "High Performance Ink Compositions".

FIELD OF THE INVENTION

This invention relates to novel ink compositions. More particularly, the instant invention is directed to high performance ink compositions having, among other things, a unique and superior co-solvent mixture. The invention is also directed to a novel colorant set, whereby the colorants which make up the colorant set are not benzidine based.

BACKGROUND OF THE INVENTION

Ink jet printing is a conventional technique by which printing is normally accomplished without contact between the printing apparatus and the medium on which the desired print characters are deposited. Such printing is accomplished by ejecting ink from an ink jet printhead of the printing apparatus via numerous methods which employ, for example, pressurized nozzles, electrostatic fields, piezoelectric elements and/or heaters for vapor phase bubble formation.

The ink compositions used in ink jet printing typically employ water, colorants and low molecular weight water-miscible solvents. The colorants which may be employed include dyes or pigments. It is desirable for consumers to have the ability to print faster. The ability to print faster, however, often requires ink compositions that dry and/or penetrate the print media fast. Such fast drying ink compositions unfortunately tend to result in poor print quality. Additionally, faster drying/penetrating inks often interfere with parts of the printing apparatus, causing, for example, poor print images.

It is of increasing interest to develop ink compositions that are not carcinogenic, dry fast, do not interfere with the printing apparatus and result in excellent print quality. This invention, therefore, is directed to novel ink compositions and particularly aqueous ink compositions which unexpectedly dry fast and/or result in excellent print quality without interfering with parts of printing apparatuses. Moreover, the instant invention is directed to a novel colorant set that results in inks capable of being printed from, for example, an ink jet printer, whereby the colorants which make up the colorant set are not, as often found, benzidine based. Further, it has been unexpectedly discovered that the superior results of the inks described in this invention are not dependent upon the addition of a surface active agent, particularly a polyoxyethylene polypropylene block co-polymer, which is not required to disperse a pigment.

DESCRIPTION OF THE PRIOR ART

Efforts for preparing ink compositions have been disclosed. In U.S. Pat. No. 5,223,028, assigned to Lexmark International, Inc., waterfast aqueous inks are described.

Still other efforts have been made to prepare ink compositions. In U.S. Pat. No. 5,536,461, assigned to Lexmark International, Inc., inks used in multi-colored printing are described.

In U.S. Pat. No. 5,656,071, the disclosure of which is incorporated herein by reference and assigned to Lexmark International, Inc., inks comprising pigments are described.

SUMMARY OF THE INVENTION

In a first aspect, the instant invention is directed to a co-solvent mixture not comprising a surface active agent which is not ground with a pigment, and comprising:

(a) at least one bishydroxy terminated thioether; and
(b) at least one oxycarbon having the formula:

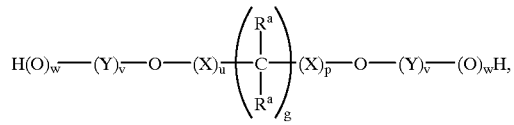

wherein
each $R^a$ is independently a hydrogen, halogen, $C_{1-6}$ alkyl, aryl or $(CR_2^b)_fO((CR_2^b)_rO_s)_tR^c$;
each $R^b$ is independently a hydrogen, halogen, $C_{1-6}$ alkyl or aryl group; f is 0 or 1;
g is from about 1 to about 6;
each r is independently an integer from about 1 to about 6;
s is 0 or 1;
t is an integer from about 0 to about 6.
$R^c$ is a hydrogen, halogen, $C_{1-6}$ alkyl, aryl or $OR^d$;
$R^d$ is a hydrogen, $C_{1-6}$ alkyl or aryl group;
X is $(CR_2^b)$;
Y is $(CR_2^b)_rO_z$;
u is an integer from about 0 to about 3;
p is an integer from about 0 to about 3;
each v is independently an integer from about 0 to about 120;
w is 0 or 1; and
z is 0 or 1,
with the provisos that $R^c$ is not a halogen or $OR^d$ when s is 1 or t is 0, and when v is 0, w is 0, and z and w cannot simultaneously be 0 or simultaneously be 1.

In a second aspect, the instant invention is directed to ink compositions comprising the above-described co-solvent mixture dissolved therein.

In a third aspect, the instant invention is directed to ink compositions comprising alkanol additives.

In a fourth aspect, the instant invention is directed to an ink set comprising the co-solvent described above.

In a fifth aspect, the instant invention is directed to a novel colorant set.

DETAILED DESCRIPTION OF THE PREFERRED EMBODIMENTS

There is essentially no limitation with respect to the bishydroxy terminated thioethers which may be employed in this invention other than that the thioethers may be used in ink compositions.

Often, the bishydroxy terminated thioethers have the formula:

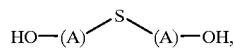

wherein each A is independently a divalent bridging radical such as $(CR_2)_q$, or an aryl group, each R is independently a hydrogen, $C_{1-6}$ alkyl group, aryl group or halogen and often each q is independently an integer from about 1 to about 7.

The aryl groups employed herein may be substituted, unsubstituted, monocyclic or polycyclic. Often, however, the aryl group is a phenylene group.

The often preferred bishydroxy terminated thioether that may be employed in this invention is one where each A is $(CR_2)_q$, wherein R is hydrogen and q is 2, particularly 2,2-thiodiethanol.

Oxycarbon as used herein is defined to mean a compound, oligomer or polymer having carbon to oxygen $sp^3$ hybridized bonds and no peroxide bonds. The oxycarbons which may be employed in this invention are limited only to the extent that they, for example, may be used in ink compositions. The oxycarbons often have a weight average ($M_W$) molecular weight of greater than about 50, and preferably, greater than about 200 and, most preferably, greater than about 350.

An illustrative list of the oxycarbons which may be employed in this invention include ethylene glycol, di(ethylene glycol), tri(ethylene glycol), poly(ethylene glycol), propylene glycol, di(propylene glycol), tri(propylene glycol), poly(propylene glycol), butylene glycol, di(butylene glycol), tri(butylene glycol), poly(butylene glycol), pentylene glycol, di(pentylene glycol), tri(pentylene glycol), poly(pentylene glycol), hexylene glycol, di(hexylene glycol), tri(hexylene glycol), poly(hexylene glycol) and mixtures thereof.

The most preferred oxycarbon employed in this invention is when each $R^a$ is hydrogen, each $R^b$ is hydrogen, g is 1, p is 0, r is 2, u is 1, v is 4, w is 0 and z is 1, particularly, poly(ethlene glycol) having a molecular weight from about 300 to about 500, including all ranges subsumed therein.

The bishydroxy terminated thioethers employed in this invention are often commercially available. They also may be prepared via conventional methods which include, for example, reacting a substituted thiol and an epoxide under acidic or basic conditions.

The oxycarbons which may be used in this invention are often commercially available. However, they may be prepared, for instance, by reacting, under acidic conditions, alkanols and a compound having an epoxide and a hydroxy group, or by polymerizing monomeric hydroxy terminated diols. Other methods for making the oxycarbons which may be employed in this invention include, for example, methods which dehydrate glycols or alcohols in the presence of polyols and acid catalysts.

The ratio of bishydroxy terminated thioether to oxycarbon in this invention is generally not limited. The only limitation is that the ratio used results in a co-solvent which can be employed to make an ink composition. Often, however, the weight percent ratio of bishydroxy terminated thioether to glycol is about 15:85 to about 85:15 and preferably from about 40:60 to about 60:40, including all ratios subsumed therein. A most preferred weight percent ratio of bishydroxy terminated thioether to oxycarbon is about 45:55 to about 55:45, including all ratios subsumed therein.

There is no limitation with respect to how the co-solvent actually is made. Generally, the bishydroxy terminated thioethers and glycols are, for example, mixed, stirred or agitated via any art recognized technique. The co-solvent may be made at ambient temperature and atmospheric pressure; however, pressure and temperature variations may be made to assist in co-solvent generation.

There is essentially no limitation with respect to the inks which may employ the above-described co-solvents. The only limitation is that the resulting inks may be used for printing on a substrate. Inks which employ the co-solvents of this invention may, therefore, be dye based, pigment based, aqueous or nonaqueous.

The inks which may be prepared with the co-solvents of this invention, whether dye based or pigment based, may comprise art recognized additives. Such art recognized additives include, for example, dispersants; humectants like glycerol and sorbitol; biocides; fungicides; bacteriocides; penetrants like 1,2-hexanediol and acetylene derived compounds; surfactants like polyorganosiloxanes; anti-kogation agents; anti-curling agents; buffers; chelating agents, and anti-bleed agents.

There is no limitation with respect to the pigments that may be employed in this invention other than that they are capable of resulting in an ink. Any of the commonly employed organic or inorganic pigments may be used. An illustrative example of the pigments which may be employed in this invention includes azo pigments such as condensed and chelate azo pigments; polycyclic pigments such as phthalocyanines, anthraquinones, quinacridones, thioindigoids, isoindolinones, quinophthalones. Still other pigments which may be employed include, for example, nitro pigments, daylight fluorescent pigments, carbonates, chromates, titanium oxides, zinc oxides, iron oxides and carbon black. Such pigments may be prepared via conventional techniques and many are commercially available.

The amount of pigment employed in the instant invention is limited only to the extent that the amount results in an ink capable of printing on a substrate. Often the amount of pigment employed is from about 0.2 to about 10.0 percent by weight and preferably from about 0.5 to about 6.0 percent by weight and most preferably about 1.0 to about 5.0 percent by weight based on total weight of the ink composition, including all ranges subsumed therein.

There is no limitation with respect to the dye compounds which may be employed in this invention other than that they are capable of resulting in an ink. An illustrative list of such dyes includes, for example, nitro dyes; nitroso dyes; azo dyes such as monoazo or polyazo dyes, mordant dyes, preformed metal complexes, pyrazolones and stilbenes; thiazoles; diphenylmethanes; triphenylmethanes such as triamines and phenols; xanthenes; acridines; azines; oxazines; thiazines; quinones and indigoids. Such dyes are commercially known and often commercially available. Many of these dyes are described in, for example, *The Chemistry of Synthetic Dyes,* by K. Venkataraman, Academic Press Inc., 1953.

The amount of dye compound employed is limited only to the extent that the resulting inks may be used to print on a substrate. Often, the amount of dye compound employed is from about 0.2 to about 20.0 percent by weight and, preferably, from about 0.5 to about 15.0 percent by weight and, most preferably, from about 1.0 to about 10.0 percent by weight based on total weight of the ink composition, including all ranges subsumed therein.

When making pigment based inks, it is desirable to employ dispersants in the inks to prevent the pigment from settling and flocculating in the ink composition. There is essentially no limitation with respect to the amount of dispersant employed other than that the amount of dispersant used results in an ink composition capable of being printed on a substrate. When making a pigment based ink, typically from about 0.05 to about 7.0 and preferably from about 0.1 to about 6.0 and most preferably from about 0.2 to 4.0 percent by weight of dispersant is employed based on total weight of the ink composition, including all ranges subsumed therein.

There is essentially no limitation with respect to the dispersants which may be employed in this invention. In fact, any non-polymeric or polymeric dispersant which may be used to make a pigment based ink composition may be employed in this invention. The often preferred dispersants are polymeric dispersants. An illustrative list of such polymeric dispersants includes random, block and branched polymers, whereby the polymers may be anionic, cationic or nonionic in nature. The polymeric dispersants typically have hydrophilic segments for aqueous solubility and hydrophobic segments for pigment interaction. Moreover, polymeric dispersants as used herein are meant to include homopolymers, copolymers (including terpolymers), immiscible blends and miscible blends.

Since the polymeric dispersants in this invention generally are limited to the extent that they are capable of dispersing a pigment in an ink composition, the precursor units which may be used to make such polymeric dispersants are not limited. Precursor, as used herein, is meant to include monomeric and macromeric units.

A general list of the monomeric units which may be employed to make such polymeric dispersants include, for example, acrylic monomers, styrene monomers and monomers having amine groups. Illustrative examples of the monomers which may be employed include acrylic and methacrylic acid, acrylamide and methacrylamide.

The polymeric dispersants often employed tend to be any of those which are commercially available as well as the polymeric dispersants which may be made via conventional techniques which include, for instance, anionic, group transfer or free radical polymerizations of monomeric units.

The often preferred polymeric dispersants which may be employed in this invention are random terpolymers prepared from three precursors. The most preferred precursors include monomeric and macromeric precursors, including at least one member selected from the group consisting of acrylates and methacrylates, at least one member selected from the group consisting of acryloyl- and methacryloyl-terminated polydialkylsiloxanes and at least one member selected from the group consisting of stearyl acrylate, stearyl methacrylate, lauryl acrylate and lauryl methacrylate.

The polymeric dispersants prepared from these precursors may be made by polymerizing the monomeric and macromeric precursors via art recognized techniques which include free radical polymerizations. A more detailed description of the most preferred polymeric dispersants which may be employed in this invention may be found in U.S. patent applications Ser. Nos. 08/578,138 and 08/667,269, the disclosures of which are incorporated herein by reference.

There is no limitation with respect to how the ink compositions are made in this invention. Essentially, the components (e.g., pigment, biocide, water) of the inks are, for example, mixed, stirred or agitated using any art recognized technique. The inks may be made at ambient temperature, atmospheric pressure or at any pressure or temperature variations which may result in ink formation. The addition of the components is not limited to any particular order, with the proviso that the resulting composition is one which may be employed to print on a substrate.

None of the conventional processing steps is meant to be ignored when preparing the ink compositions of this invention. Therefore, for example, it is within the scope of this invention to grind pigments to their desired particle/agglomerate sizes via art recognized milling processes. It is also within the scope of this invention to mix the pigments with the polymeric dispersants of choice prior to combining the pigments with any other components of the inks.

It is also within the scope of this invention to add the bishydroxy terminated thioethers and oxycarbons independent of one another to the ink composition being prepared. The term co-solvent, therefore, is meant to include the pre-mixed product of the bishydroxy terminated thioether and oxycarbon as well as the product which results after the thioether and oxycarbon have been added separately during the preparation of desired ink compositions.

The preferred penetrant employed in the ink compositions of this invention is an alkanol, and preferably a straight chain alkanol having about 1 to about 5 carbon atoms with the hydroxy group at position 1. The amount of alkanol added to the ink compositions is limited only to the extent that the resulting ink compositions are capable of being printed on a substrate. Often, however, the amount of straight chain alkanol employed is from about 0.1 to about 10.0 and, preferably, from about 0.25 to about 6.0 and, most preferably, from about 0.5 to about 3.0 percent by weight based on total weight of the ink composition, including all ranges subsumed therein. The most preferred alkanol employed in this invention is 1-propanol.

The preferred penetrants employed in this invention are typically commercially available or made by conventional processes which include $S_N1$ reactions utilizing water as a nucleophile. It is noted herein that the preferred penetrants described in this invention are not limited for use in any particular ink compositions. In fact, they may be employed in any ink composition capable of being printed on a substrate.

Any other additives which may be employed in the inks of this invention may be added in the amounts/ranges typically found in the art. The balance of the ink compositions described herein comprises water if an aqueous ink composition is desired. If a non-aqueous ink composition is desired, the balance of the ink compositions will comprise, for example, the co-solvent of this invention and/or oils in lieu of water. Such oils are generally not limited and an illustrative list includes mineral oil, tung oil, soybean oil, and mixtures thereof.

The amount of co-solvent (total amount of oxycarbon plus bishydroxy terminated thioether) which may be employed in this invention is generally not limited. Depending on the colorant selected, the amount of co-solvent employed, subsequent to the addition of the required components to make an ink, can be up to about 100% of the balance of the ink composition. Often, the amount of co-solvent employed is from about 5.0 to about 40.0 preferably from about 15.0 to about 25.0 percent by weight based on total weight of the ink composition, including all ranges subsumed therein.

Often, it is desirable to employ the ink compositions of this invention in ink jet printers. When doing so, the ink compositions are used, for example, in ink jet print cartridges (which may be re-filled with ink compositions) having at least one ink chamber (reservoir). When one ink chamber exists, the ink jet print cartridge may employ any colorant, including carbon black, cyan, magenta and yellow colorants. When, for example, an ink jet print cartridge having three chambers is employed, each chamber may be filled with a different colored ink composition of this invention. Often, the most preferred colored ink compositions are those which are cyan, magenta and yellow in color. Often preferred colorants employed in this invention include CI Pigment Blue 15:4, CI Pigment Blue 15:3, CI Pigment Red 122, CI Pigment Yellow 74, and carbon black.

In addition thereto, the novel colorant set described in this invention includes colorants which can be dyes, pigments or combinations thereof.

The novel colorant set of this invention comprises:

(a) a quinacridone;

(b) a phthalocyanine; and
(c) a monoazo compound.

The quinacridone often has the formula

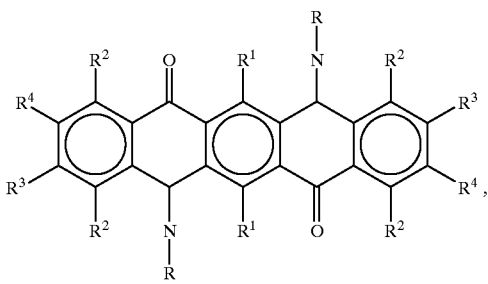

wherein each R is independently a hydrogen or $C_{1-6}$ alkyl group and each $R^1$, $R^2$, $R^3$ and $R^4$ is independently a hydrogen, $C_{1-6}$ alkyl, halogen, alkoxy group, hydroxy group, sulfonic acid group, carboxylic acid group or ester group. Regarding $R^1$, $R^2$, $R^3$ and $R^4$, the preferred alkyl group is a methyl group; the preferred halogen is chlorine; and the preferred alkoxy group is a methoxy group. Most preferably, however, the quinacridone employed in this invention is one having each R, $R^1$, $R^2$ and $R^3$ as hydrogen, and each $R^4$ as a methyl group (Pigment Red 122).

The quinacridones which may be employed in this invention are, commercially available, for example, from Sun Chemical Corporation. They may also be made from commercially available precursors which can be subjected to reactions which include, for instance, electrophilic aromatic substitutions and/or electrophilic aliphatic substitutions.

The phthalocyanines which may be employed in this invention may be substituted or unsubstituted. If substituted, substituents which may be substituted on the compound include, for example, at least one member selected from the group consisting of sulfonic acid groups, caboxylic acid groups and ester groups.

The central metal atom in the phthalocyanines which may be employed in this invention is limited only to the extent that it results in phthalocyanines capable of being used as colorants in inks. The central atom is often a transition metal, and preferably, copper, iron, nickel or cobalt.

Moreover, the phthalocyanines employed in this invention can be alpha or beta type as well as crystallizing, non-crystallizing or non-crystallizing non-flocculating. Most preferably, the phthalocyanines employed in this invention have copper as a central atom, are unsubstituted and are non-crystallizing non-flocculating (Pigment Blue 15:4). Like the quinacridones which may be employed in this invention, the phthalocyanines are commercially available, for example, from Sun Chemical Company. They may also be prepared from commercially available precursors that have been subjected to, for example, reactions like electrophilic aromatic substitutions and/or electrophilic aliphatic substitutions.

The monoazo compounds which may be employed in this invention often have the formula

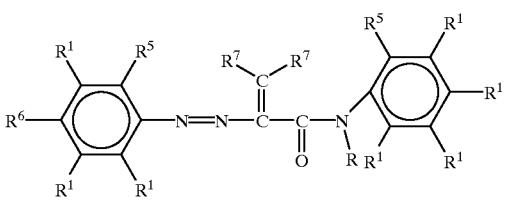

wherein R is as previously defined; $R^1$ is as previously defined; each $R^5$ is independently a hydrogen, $C_{1-6}$ alkyl, halogen, alkoxy group, hydroxy group, sulfonic acid group, carboxylic acid group or ester group; $R^6$ is a hydrogen, $C_{1-6}$ alkyl, halogen, alkoxy group, hydroxy group, sulfonic acid group, carboxylic acid group, ester group or nitro group; and each $R^7$ is independently a $C_{1-6}$ alkyl, hydroxy group or alkoxy group. The preferred monoazo compounds employed in this invention have R as hydrogen, each $R^1$ as hydrogen, each $R^5$ as methoxy groups, $R^6$ as a nitro group, and one $R^7$ as a methyl group, and one $R^7$ as a hydroxy group, with the proviso that the methyl group is cis to the azo bond and the hydroxy group is trans to the azo bond (Pigment Yellow 74).

The monoazo compounds employed in this invention are commercially available from, for example, Sun Chemical Corporation. Also, they may be prepared from commercially available precursors that can be subjected to, for example, electrophilic aromatic substitutions and/or electrophilic aliphatic substitutions.

The novel colorant set of this invention may comprise pigments and/or dyes. Whether or not the colorants are pigments or dyes depends upon each colorant's substituents, the co-solvents employed, and whether or not the resulting inks prepared from the novel colorant set are aqueous or not. It is noted that the colorants of the novel colorant set of this invention may be used to prepare aqueous and/or non-aqueous ink compositions, and that the inks prepared may include any of the conventional ink co-solvents, dispersants and additives known in the art. Preferably, the colorant set comprises all pigments, and the inks prepared therefrom have at least one member selected from the group consisting of a bishydroxy terminated thioether, oxycarbon, the preferred dispersants described herein and a $C_{1-6}$ diol, like 1,3-propanediol, and said inks prepared therefrom form a cyan, magenta and yellow ink set capable of being used in ink jet printers.

The ratio of colorants in the novel colorant set employed on this invention is limited only to the extent that the ratio results in inks capable of being printed on a substrate. Often, however, when the novel colorant set is employed to make, for example, at least 3 ink compositions, the ratio of quinacridone:phthalocyanine:monoazo compound is from about 3.0 to about 5.0 weight percent:from about 2.0 to about 4.0 weight percent:from about 1.0 to about 5.0 weight percent. Preferably, however, the ratio is 4.0 weight percent:3.0 weight percent:4.0 weight percent, or 8.0 weight percent:4.0 weight percent:3.0 weight percent. Weight percent, regarding the colorants of the novel colorant set of this invention, is defined to mean the weight percent of the colorant based on total weight of the ink composition made with that particular colorant.

It is noted herein that when the preferred colorants are employed to make a colorant set (C.I. Pigment Red 122; C.I. Pigment Blue 15:4; C.I. Pigment Yellow 74) a Munsell 5R is surprisingly obtained in the color gamut; particularly, in the absence of benzidine based colorants.

The following examples are provided to illustrate and to facilitate the understanding of the invention. The examples are not intended to be a restriction of the scope of the invention. All products obtained may be confirmed using art recognized techniques which include proton and carbon 13 nuclear magnetic resonance spectroscopy. Optical density was determined by using a commercially available densitometer, and maintenance was determined by visual analysis of a printhead sitting idle (capped and uncapped) for a defined period of time. Maintenance was also determined by visually analyzing a printhead after use in an inkjet printer. Dry times were determined by observation and a timing device on a variety of office papers (between 5 and 12). Munsell chroma values were determined with a conventional reflectance spectrophotometer (excluding spectral component), employing an integrating sphere, diffuse illumination and a pulsed xenon arc lamp at an eight degree angle to the normal of the sample surface.

EXAMPLE 1

A reaction vessel was charged with a solution of methacrylic acid 22.8 g (265 mmol), monomethacryloxypropyl-terminated polydimethylsiloxane (PDMS-MA) 7.84 g (8.7 mmol, MW 900), stearyl methacrylate 2.95 g (8.7 mmol), 1-dodecanethiol 2.06 g (9.9 mmol), dimethyl 2,2-azobisisobutyrate 0.64 g (2.84 mmol) and isopropyl alcohol 100 mL. The resulting mixture was degassed with argon (done by repeated partial evacuation followed by argon backfill using a Firestone Valve) then heated to 70° C. for 16 hours. The mixture was allowed to cool to about room temperature and subsequently added slowly to 1.0 L of hexane while stirring. The resulting solid product (polymeric dispersant) was isolated by vacuum filtration and dried in vacuum overnight at 80° C. The yield of the reaction was about 85%. The dried polymeric dispersant (the preferred dispersant in this invention) was characterized by proton NMR and GPC.

A stock solution of the polymeric dispersant was prepared by charging a 400 mL beaker, on a hot plate with a magnetic stirrer, with 40.0 g of deionized water. Added to the beaker with deionized water was 12.0 g of dried polymeric dispersant and 18.0 g of 20% KOH. The resulting mixture was heated to about 50C for about 2 hours. The pH of the mixture was adjusted to 7.5 by the addition of 20% KOH. Deionized water was then added to the mixture to bring the weight of the resulting solution to 1 00.0 g (12% polymeric dispersant).

A beaker was then charged with 133.33 g of the polymeric dispersant solution prepared above, 202.67 g of deionized water and 64.0 g of carbon black. The contents were stirred with a commercial mixer. The resulting mixture was then added to a grinding mill having 0.8 mm yttrium coated zirconium beads. The mixture was ground for about 90 minutes, resulting in a carbon black concentrate.

A second beaker was charged with 10.0 g of polyethylene glycol having a weight average molecular weight of about 400. 10.0 g of 1,3-propanediol were then added while stirring with a magnetic stir bar. After a homogeneous mixture resulted, 61.05 g of water were added while stirring. To the resulting mixture, 0.20 g of commercially available biocide solution having 1,2-benz-isothiazolin-3-one were added with stirring resulting in an ink vehicle.

A third beaker was charged with 18.75 g of the carbon black concentrate prepared above, and the entire ink vehicle produced above was slowly added while stirring. The resulting composition was filtered to 1.2 microns using a commercially available pressurized filtration apparatus having a series of disk filters. The resulting filtered solution is a commercially available black ink composition. The black ink composition had an optical density of about 1.36, a dry time of about 48 seconds and acceptable maintenance properties.

EXAMPLE 2

A beaker was charged with 111.11 g of the polymeric dispersant solution similar to the one prepared in Example 1 and 222.22 grams of deionized water. 66.67 g of carbon black were added and the contents were stirred with a commercial mixer. The resulting mixture then was added to a grinding mill having 0.8 mm yttrium coated zirconium beads. The mixture was ground for about 90 minutes, resulting in a carbon black concentrate.

A second beaker was charged with 15.0 g of polyethylene glycol having a weight average molecular weight of about 400 and 15.0 g of 2,2-thiodiethanol with stirring using a magnetic stir bar. After a homogeneous mixture was produced, about 80.7 g of deionized water were added with stirring. To the resulting mixture, 3.0 g of 1-propanol and 0.3 grams of a commercially available biocide solution having 1,2-benz-isothiazolin-3-one were added resulting in an ink vehicle.

A third beaker was charged with 36.0 g of the carbon black concentrate and the ink vehicle prepared above. The ink vehicle was added slowly while the resulting contents were stirred. The resulting composition was filtered to 1.2 microns via an art recognized pressurized filtration apparatus having a series of disk filters. The resulting filtered solution is a superior black ink composition. The superior black ink composition unexpectedly displayed an optical density of about 1.33, a dry time of about 28 seconds and acceptable maintenance properties.

EXAMPLE 3

The ink composition prepared in Example 3 was prepared in a manner similar to one described in Example 2 except that the weight percent of the co-solvent employed in this Example was one-half the weight percent of the amount of co-solvent employed in Example 2, and no biocide or n-propanol was used. The balance was made up with deionized water. The resulting ink composition is a superior black ink composition. The superior black ink composition unexpectedly displayed an optical density of about 1.31, a dry time of about 38 seconds and acceptable maintenance properties.

EXAMPLE 4

A beaker was charged with 166.67 g of polymeric dispersant solution similar to the one described and prepared in Example 1, 173.33 g of deionized water and 60.0 g of a commercially available cyan pigment (Pigment Blue 15:3), under high shear mixing conditions. The resulting mixture was ground in a grinding mill using 0.8 mm yttrium coated zirconium beads for about 4 hours. The resulting composition was a cyan ink concentrate.

A second beaker was charged with 10.0 g of polyethylene glycol having a weight average molecular weight of about 400, 10.0 g of 2,2-thiodiethanol, 66.47 g of deionized water and 0.2 g of commercially available biocide solution having 1,2-benz-isothiazolin-3-one, while stirring. The resulting composition was an ink vehicle.

A final beaker was charged with 13.33 g of the above-produced cyan concentrate, and the entire ink vehicle produced in this Example was slowly added while stirring. The resulting ink composition was a superior cyan ink composition. The superior cyan ink composition had average Munsell chroma values of greater than about 12.0 on a variety of office papers, a dry time of about 42 seconds and acceptable maintenance properties.

EXAMPLE 5

The ink composition of Example 5 was prepared in a manner similar to the one described in Example 4 except that 96.0 g of a commercially available magenta pigment (Pigment Red 122), in lieu of cyan pigment, were mixed with 200.0 g of a polymeric dispersant similar to the one described and prepared in Example 1. The contents were ground with about 0.8 mm polystyrene beads in lieu of yttrium coated zirconium beads in a grinding mill resulting in a magenta ink concentrate.

A second beaker was charged with 9.0 g of polyethylene glycol having a molecular weight of about 400, 12.0 g of 2,2-thiodiethanol, 9.0 g of glycerol, 94.7 g of deionized water and 0.3 g of a commercially available biocide (1,2-benz-isothiazolin-3-one). In a final beaker, the vehicle was slowly added to and stirred with 25 g of the magenta ink concentrate. The resulting composition after stirring is a superior magenta ink composition. The superior magenta ink composition had average Munsell chroma values of greater than about 12.0 on a variety of office papers, a dry time of about 42 seconds and acceptable maintenance properties.

EXAMPLE 6

The ink composition of Example 6 was prepared in a manner similar to the one described in Example 1 except that 75.0 g of polymeric dispersant solution, 78.0 g of deionized water and 27.0 g of commercially available yellow pigment (Pigment Yellow 74) were employed and mixed via high shear mixing. The resulting mixture was ground in an attritor utilizing 1.25 mm yttrium coated zirconium beads for about 12 hours. The resulting product after grinding was combined with 96.62 g of deionized water with stirring to produce a yellow ink concentrate.

A second beaker was charged with 15.0 g of polyethylene glycol having a weight average molecular weight of about 400, 15.0 g of 2,2-thiodiethanol, 96.92 g of deionized water, 0.3 g of commercially available biocide solution having 1,2-benz-isothiazolin-3-one while mixing with a stir bar. The resulting mixture was stirred while 23.08 g of the yellow concentrate were slowly added. After stirring, the resulting composition was a superior yellow ink composition. The superior yellow ink composition had average Munsell chroma values of greater than about 11.0 on a variety of office papers, a dry time of about 48 seconds and acceptable maintenance properties.

EXAMPLE 7

The ink of Example 7 was prepared in a manner similar to the one in Example 4 except that Pigment Blue 15:4 was employed in lieu of Pigment Blue 15:3.

EXAMPLE 8

The ink of Example 8 was prepared in a manner similar to the one described in Example 7 except that 10.0 grams of 1,3-propanediol were used in lieu of 2,2-thiodiethanol.

What is claimed is:

1. A colorant set comprising:
    (a) a composition comprising a terpolymer dispersant and a quinacridone;
    (b) a composition comprising the terpolymer dispersant and a phthalocyanine; and
    (c) a composition comprising the terpolymer dispersant and a monoazo compound; wherein the terpolymer dispersant is synthesized from:
    at least one member selected from the group consisting of acrylic acid and methacrylic acid:
    at least one member selected from the group consisting of acrylol-terminated polydialkysiloxanes and methacrylol-terminated polydialkylsiloxanes; and
    at least one member selected from the group consisting of stearyl acrylate, stearyl methacrylate, lauryl acrylate and lauryl methacrylate.

2. A colorant set in accordance with claim 1, wherein said quinacridone has the formula

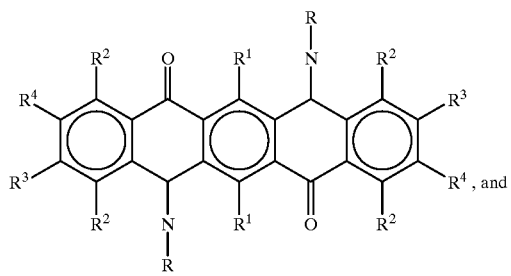

each R is independently a hydrogen or $C_{1-6}$ alkyl group, and each $R^1$, $R^2$, $R^3$ and $R^4$ is independently a hydrogen, $C_{1-6}$ alkyl group, halogen, alkoxy group, hydroxy group, sulfonic group, carboxylic acid group or ester group.

3. A colorant set in accordance with claim 2 wherein R, $R^1$, $R^2$ and $R^3$ is hydrogen and $R^4$ is a methyl group.

4. A colorant set in accordance with claim 1 wherein said phthalocyanine is unsubstituted, or substituted with at least one member selected from the group consisting of a sulfonic group, carboxylic acid group and ester group.

5. A colorant set in accordance with claim 4 wherein said phthalocyanine has a central atom which is a transition metal.

6. A colorant set in accordance with claim 5 wherein said transition metal is selected from the group consisting of Cu, Fe, Ni and Co.

7. A colorant set in accordance with claim 6 wherein said transition metal is Cu and said phthalocyanine is unsubstituted.

8. A colorant set in accordance with claim 1 wherein said monoazo compound has the formula:

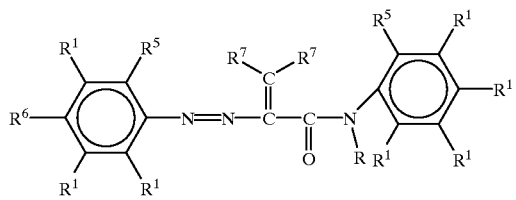

wherein R is a hydrogen or $C_{1-6}$ alkyl group; $R^1$ is a hydrogen, $C_{1-6}$ alkyl group, halogen, alkoxy group, hydroxy group, sulfonic group, carboxylic acid group or ester group; each $R^5$ is independently a hydrogen, $C_{1-6}$ alkyl, halogen, alkoxy group, hydroxy group, sulfonic acid group, carboxylic acid group or ester group; $R^6$ is a hydrogen, $C_{1-6}$ alkyl, halogen, alkoxy group, hydroxy group, sulfonic acid group, carboxylic acid group, ester group or nitro group; and each $R^7$ is independently a $C_{1-6}$ alkyl, hydroxy group or alkoxy group.

9. A colorant set in accordance with claim 8 wherein R is hydrogen, $R^1$ is hydrogen, each $R^5$ is a methoxy group, $R^6$ is a nitro group, and one $R^7$ is a methyl group and one $R^7$ is a hydroxy group, with the proviso that the methyl group is cis to the azo bond and the hydroxy group is trans to the azo bond.

10. A colorant set in accordance with claim 1 wherein said quinacridone is C.I. Pigment Red 122, said phthalocyanine is C.I. Pigment Blue 15:4, and said monoazo compound is C.I. Pigment Yellow 74.

11. A colorant set in accordance with claim 1 wherein said colorant set is used to make an ink set comprising a cyan ink, a magenta ink, and a yellow ink.

12. A colorant set in accordance with claim 11 wherein said ink set is used in ink jet printers.

13. A colorant set in accordance with claim 11 wherein said cyan ink comprises 1,3-propanediol and said magenta and yellow inks comprise 2,2-thiodiethanol.

14. A colorant set according to claim 11, wherein at least one ink has an average Munsell chroma value of greater than about 11.0.

15. A colorant set in accordance with claim 1 having a ratio of quinacridone:phthalocyanine:monoazo compound from about 3.0 to about 5.0 weight percent:from about 2.0 to about 4.0 weight percent:from about 1.0 to about 5.0 weight percent.

16. A colorant set in accordance with claim 15 wherein said weight percent ratio of quinacridone:phthalocyanine:monoazo compound is 4.0:3.0:4.0.

17. A colorant set in accordance with claim 15 wherein said weight percent ratio of quinacridone:phthalocyanine:monoazo compound is 4.0:4.0:3.0.

18. A colorant set according to claim 1, wherein all colorants are pigments.

19. An ink set comprising a cyan ink, a magenta ink, and a yellow ink, wherein:
the cyan ink comprise a phthalocyanine and a $C_{1-6}$ diol;
the magenta ink comprises a quinacridone and a bishydroxy terminated thioether; and
the yellow ink comprises a monoazo compound and a bishydroxy terminated thioether; wherein the quinacridone, phthalocyanine, and monoazo compound form a colorant set having a weight percent ratio of quinacridone:phthalocyanine:monoazo compound of from about 3.0 to about 8.0:from about 2.0 to about 4.0:from about 1.0 to about 5.0.

20. An ink set according to claim 19, wherein the quinacridone, phthalocyanine, and monoazo compound form a colorant set having a weight percent ratio of quinacridone:phthalocyanine:monoazo compound of from about 3.0 to about 5.0:from about 2.0 to about 4.0:and from about 1.0 to about 5.0.

21. An ink set according to claims 19, wherein at least one ink further comprises an oxycarbon having the formula:

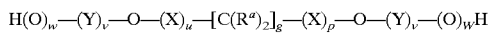

wherein
each $R^a$ is independently a hydrogen, halogen, $C_{1-6}$ alkyl, aryl or $(CR^b{}_2)_fO((CR^b{}_2)_rO_s)_tR^c$;
each $R^b$ is independently a hydrogen, halogen, $C_{1-6}$ alkyl or aryl group;
f is 0 or 1;
g is from about 1 to about 6;
each r is independently an integer from about 1 to about 6;
s is 0 or 1;
t is an integer from about 0 to about 6.
$R^c$ is a hydrogen, halogen, $C_{1-6}$ alkyl, aryl or $OR^d$;
$R^d$ is a hydrogen, $C_{1-6}$ alkyl or aryl group
X is $(CR^b{}_2)$;
Y is $(CR^b{}_2)_rO_z$;
u is an integer from about 0 to about 3;
p is an integer from about 0 to about 3;
each v is independently an integer from about 0 to about 120;
w is 0 or 1; and P2 z is 0 or 1,
with the provisos that $R^c$ is not a halogen or $OR^d$ when s is 1 or t is 0; and when v is 0, w is 0, and z and w cannot simultaneously be 0 or simultaneously be 1.

22. An ink set according to claim 21, wherein the magenta ink and the yellow ink each further comprise an oxycarbon and wherein the total amount of bishydroxy terminated thioether and oxycarbon is from about 5 to about 40%, by weight, and the weight ratio of bishydroxy terminated thioether to oxycarbon is from about 15:85 to about 85:15.

23. An ink set according to claim 21, wherein at least one ink further comprises from about 0.1% to about 10%, by weight, of a straight chain 1-alkanol having from about 1 to about 5 carbon atoms.

24. An ink set according to claim 19, wherein at least one ink has an average Munsell chroma value of greater than about 11.0.

25. An ink set according to claim 19, wherein at least one ink further comprises a terpolymer dispersant is synthesized from:
at least one member selected from the group consisting of acrylic acid and methacrylic acid;
at least one member selected from the group consisting of acrylol-terminated polydialkysiloxanes and methacrylol-terminated polydialkylsiloxanes; and
at least one member selected from the group consisting of stearyl acrylate, stearyl methacrylate, lauryl acrylate and lauryl methacrylate.

26. A pigment set comprising:
(a) a composition comprising a terpolymer dispersant and a quinacridone pigment;
(b) a composition comprising a terpolymer dispersant and a phthalocyanine pigment; and
(c) a composition comprising a terpolymer dispersant and a monoazo compound pigment;
wherein the terpolymer dispersant is synthesized from:
at least one member selected from the group consisting of acrylic acid and methacrylic acid:
at least one member selected from the group consisting of acrylol-terminated polydialkysiloxanes and methacrylol-terminated polydialkylsiloxanes; and
at least one member selected from the group consisting of stearyl acrylate, stearyl methacrylate, lauryl acrylate and lauryl methacrylate; and
wherein the pigment set has a weight percent ratio of quinacridone:phthalocyanine:monoazo compound pigment of from about 3.0 to about 4.0:from about 3.0 to about 4.0:from about 3.0 to about 4.0.

27. A pigment set according to claim 26, wherein the quinacridone has the formula:

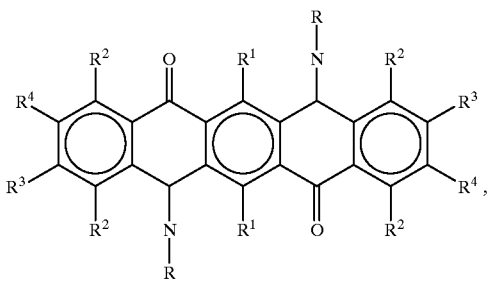

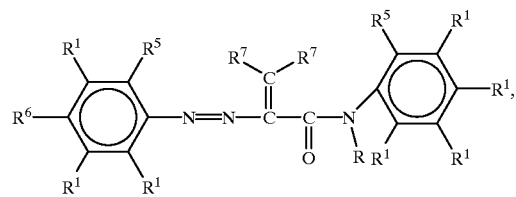

wherein said monoazo compound has the formula:

wherein each R is independently a hydrogen or $C_{1-6}$ alkyl group, and each $R^1$, $R^2$, $R^3$ and $R^4$ is independently a hydrogen, $C_{1-6}$ alkyl group, halogen, alkoxy group, hydroxy group, sulfonic group, carboxylic acid group or ester group;

wherein the phthalocyanine is selected from the group consisting of unsubstituted phthalocyanine, phthalocyanines substituted with at least one member selected from the group consisting of a sulfonic group, carboxylic acid group and ester group and mixtures thereof, and wherein the phthalocyanine has a central atom selected from the group consisting of Cu, Fe, Ni and Co; and wherein R is a hydrogen or $C_{1-6}$ alkyl group; $R^1$ is a hydrogen, $C_{1-6}$ alkyl group, halogen, alkoxy group, hydroxy group, sulfonic group, carboxylic acid group or ester group; each $R^5$ is independently a hydrogen, $C_{1-6}$ alkyl, halogen, alkoxy group, hydroxy group, sulfonic acid group, carboxylic acid group or ester group; $R^6$ is a hydrogen, $C_{1-6}$ alkyl, halogen, alkoxy group, hydroxy group, sulfonic acid group, carboxylic acid group, ester group or nitro group; and each $R^7$ is independently a $C_{1-6}$ alkyl, hydroxy group or alkoxy group.

* * * * *